(12) United States Patent
Peng

(10) Patent No.: US 8,279,269 B2
(45) Date of Patent: Oct. 2, 2012

(54) MOBILE INFORMATION KIOSK WITH A THREE-DIMENSIONAL IMAGING EFFECT

(76) Inventor: Ke-Ou Peng, Taipei (TW)

( * ) Notice: Subject to any disclaimer, the term of this patent is extended or adjusted under 35 U.S.C. 154(b) by 698 days.

(21) Appl. No.: 12/432,257

(22) Filed: Apr. 29, 2009

(65) Prior Publication Data

US 2010/0277569 A1     Nov. 4, 2010

(51) Int. Cl.
*H04N 13/02* (2006.01)
(52) U.S. Cl. ........ 348/51; 348/46; 348/47; 348/E13.075
(58) Field of Classification Search .......... 359/463, 359/464; 375/240.01; 345/522, 427; 382/154; 348/51, 46, 47, E13.075
See application file for complete search history.

(56) References Cited

U.S. PATENT DOCUMENTS

| | | | | |
|---|---|---|---|---|
| 7,796,134 B2 * | 9/2010 | Vesely et al. | ................. | 345/427 |
| 2005/0207486 A1 * | 9/2005 | Lee et al. | ................. | 375/240.01 |
| 2008/0232680 A1 * | 9/2008 | Berestov et al. | ............... | 382/154 |
| 2008/0247042 A1 * | 10/2008 | Scwerdtner | .................... | 359/463 |
| 2009/0073556 A1 * | 3/2009 | Bent-Gourley | ............... | 359/463 |
| 2009/0295790 A1 * | 12/2009 | Pockett | .......................... | 345/419 |
| 2010/0208342 A1 * | 8/2010 | Olsen | ........................... | 359/464 |
| 2010/0238184 A1 * | 9/2010 | Janicki | .......................... | 345/522 |

* cited by examiner

*Primary Examiner* — Jungwon Chang
(74) *Attorney, Agent, or Firm* — Muncy, Geissler, Olds & Lowe, PLLC

(57) ABSTRACT

The present invention discloses a mobile information kiosk with a three-dimensional imaging effect, which is primarily applied to a hand-held mobile information kiosk. The kiosk includes a dual-lens photographing device with various light traveling angles, a displayer, a stereoscopic optical element which is provided on the displayer, and a data processing module for three-dimensional display. The displayer displays an interleaved grid-shape pattern which is processed by the data processing module. The grid-shape pattern is deflected leftward and rightward in a longitudinal series through the stereoscopic optical element and is projected respectively to both eyes of a user, such that the user can visually sense a three-dimensional image.

13 Claims, 7 Drawing Sheets

MOBILE INFORMATION KIOSK WITH A THREE-DIMENSIONAL IMAGING EFFECT

BACKGROUND OF THE INVENTION a) Field of the Invention

The present invention relates to an imaging device and more particularly to a mobile information kiosk which is provided with a three-dimensional imaging effect.

b) Description of the Prior Art

How a person can have a sense of three-dimensional vision is primarily due to that when the person watches an object, there is an angular difference in the same object that is seen by a left eye and a right eye, resulting in a three-dimensional sense in a brain, and enabling the person to determine a front and rear location of the object. Therefore, when using this principle to generate a three-dimensional image, as long as that the two eyes can see the images at different visual angles, then the three-dimensional image can be regenerated, such that the three-dimensional sense can be obtained when the images of two eyes are fused in the brain. In addition, to achieve this object, there are a lot of apparatuses and implementation methods, and the most common one is a simple complementary color spectrum principle, wherein a same pre-processed image is filtered through a pair of red/blue-green glasses, allowing two eyes to see images of different levels, like making and regenerating a stereoscopic film.

However, this kind of pre-processed image will require the auxiliary color filter glasses.

Due to imaging, it will be easier to describe configuration of an object if there is the three-dimensional vision; for example, in terms of communication with a 3G (Third Generation) cell phone or build-up of images in an information kiosk, the three-dimensional vision will facilitate describing a shape of the object. Accordingly, a technology which is provided with a compact size to facilitate carrying by hands and supplies a three-dimensional imaging effect is definitely required on the market.

SUMMARY OF THE INVENTION

The primary object of the present invention is to provide a mobile information kiosk with a three-dimensional imaging effect, which allows a user to identify a three-dimensional image purely by naked eyes without using a pair of special 3D (Three Dimensional) glasses or other large elements, such that the kiosk can be applied in a hand-held information kiosk like a small-size cell phone or a PDA (Personal Digital Assistant) to produce and regenerate three-dimensional images.

Accordingly, the mobile information kiosk with a three-dimensional imaging effect of the present invention includes primarily a photographing device, a displayer, a stereoscopic optical element which is provided on the displayer, and a data processing module for three-dimensional display. The photographing device is a dual-lens device; each lens retrieves video signals at a different angle. The video signals are then processed into an image signal which alternates in a grid and is transmitted to the displayer. When the grid-shape pattern which is processed by the data processing module is displayed on the displayer, the image is deflected leftward and rightward in a longitudinal series by the added stereoscopic optical element; this effect is equivalent to projecting respectively a non-partitioned first image and second image (taken by the photographing device) at different angles to a left sight and a right sight of the user, enabling the user to see the three-dimensional image.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
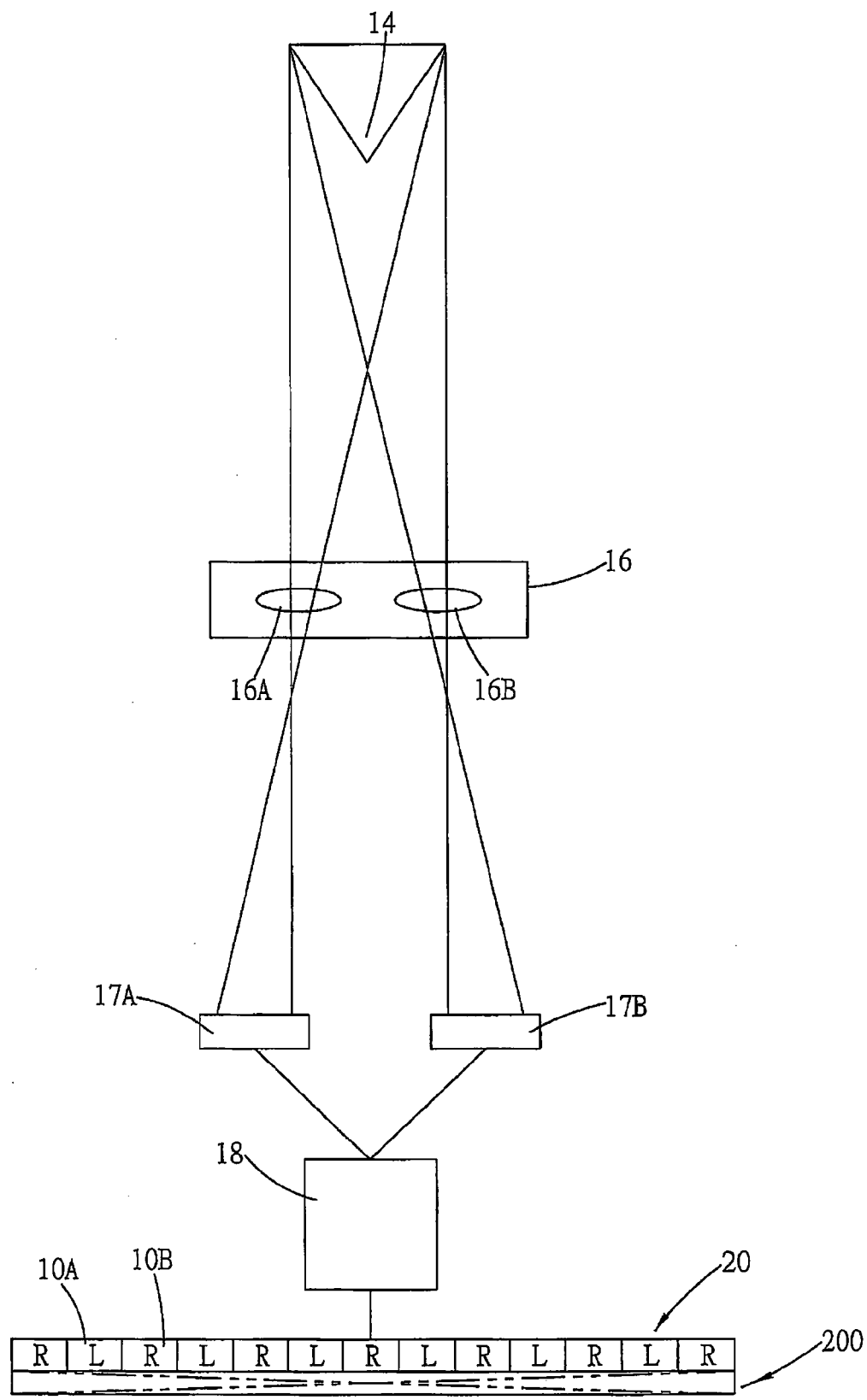
FIG. 1 shows a schematic view of an implementation of the present invention.

Referring to FIG. 1, it shows a schematic view of an implementation of a mobile information kiosk with a three-dimensional imaging effect, according to the present invention. As shown in the drawing, in addition to elements required for a target of application such as a cell phone or all kinds of mobile information apparatuses, the mobile information kiosk with a three-dimensional imaging effect is also provided with a dual-lens photographing device 16 which takes images at a left visual angle and a right visual angle, a displayer 20, an offset optical element 200 which is provided on the displayer 20, and a data processing module for three-dimensional display 18. The photographing device 16 includes lenses 16A, 16B, and CCD (Charge Coupled Device) or CMOS (Complementary Metal-Oxide Semiconductor) light sensors 17A, 17B. The photographing device 16 and the displayer 20 are located at a different angular position on an exterior surface of the kiosk respectively, allowing a user to watch by eyes the displayer 20 during photographing.

Figure 2:
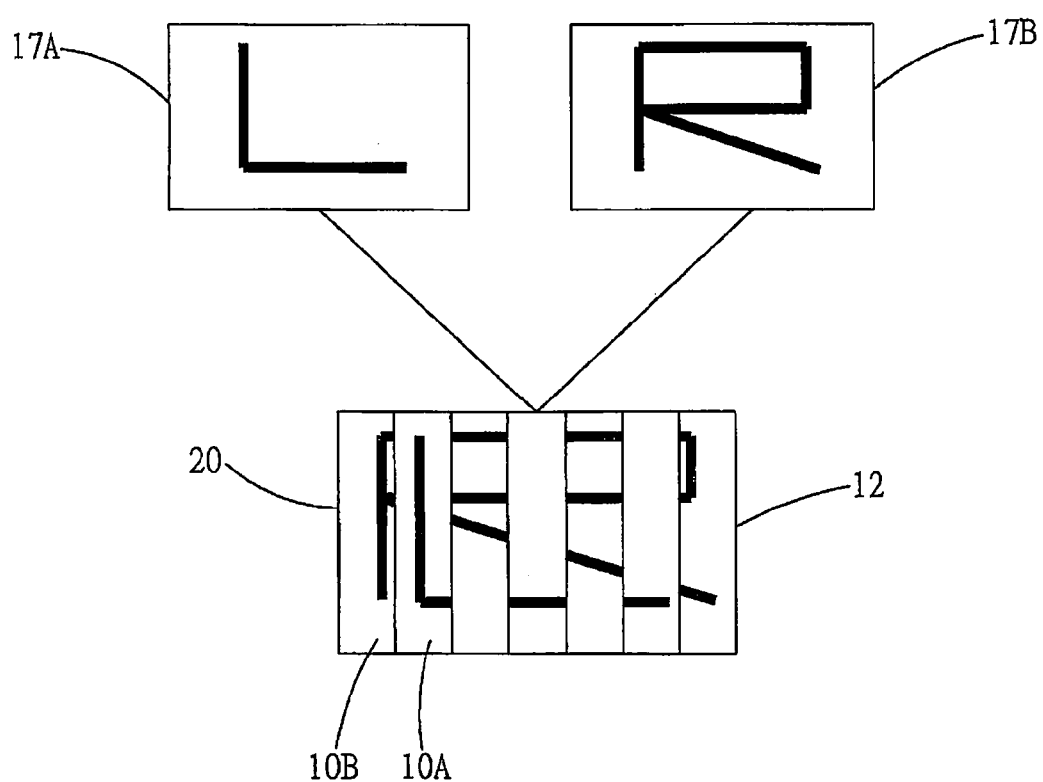
FIG. 2 shows a preliminary display diagram of a displayer of the present invention.

Referring to FIG. 1 and FIG. 2, to disclose briefly, images which are sensed respectively by the light sensors 17A, 17B are processed by the data processing module for three-dimensional display 18 and handed over to the displayer 20 to regenerate and display an interleaved grid-shape pattern 12. When the interleaved grid-shape pattern 12 is deflected leftward and rightward in a longitudinal series through the offset optical element 200, this effect is equivalent to projecting respectively a first image 10A and a second image 10B, which are interleaved adjacently, to a left eye L and a right eye R of the user, allowing the user to see a three-dimensional image. Thus, as the mobile information kiosk with a three-dimensional imaging effect, according to the present invention, is able to provide the three-dimensional images for display without using a pair of special stereoscopic glasses or other large elements, an information kiosk, like a small-size cell phone or a PDA, can also be provided with the three-dimensional imaging effect.

There are at least two kinds of implementations of the optical elements in entire arrangement. First, referring to FIG. 3 and FIG. 4, an object 14 is focused by the photographing device 16 to the light sensors 17A, 17B respectively. After being coupled into a separate video signal and processed synchronously by the data processing module for three-dimensional display 18, the interleaved planar grid-shape pattern 12 as shown in FIG. 2 will be formed on the displayer 20. The offset optical element 200 which is attached on a front surface of the displayer 20 is provided with a circular, semi-circular or rhombus cross section, and includes plural cylindrical lenses 20A which are arranged in a parallel series. By a refraction effect of different angles on a surface, the offset optical element 200 projects at a different angle the partitioned grid-shape first and second images 10A, 10B to the left and right eyes L, R of an observer to sense the three-dimensional images.

Figure 5:
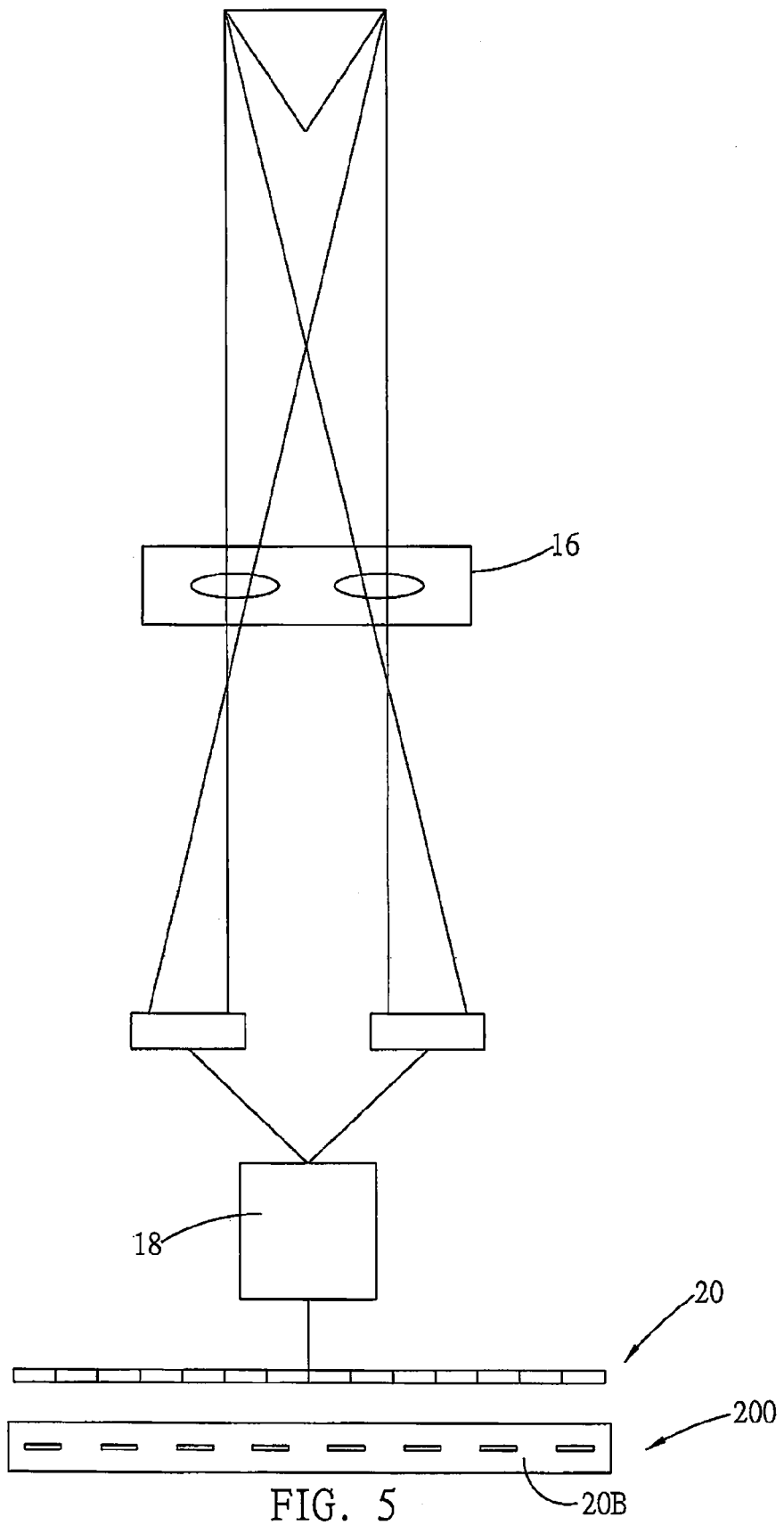
FIG. 5 shows a schematic of an implementation of the present invention using a raster to partition images.
Figure 6:
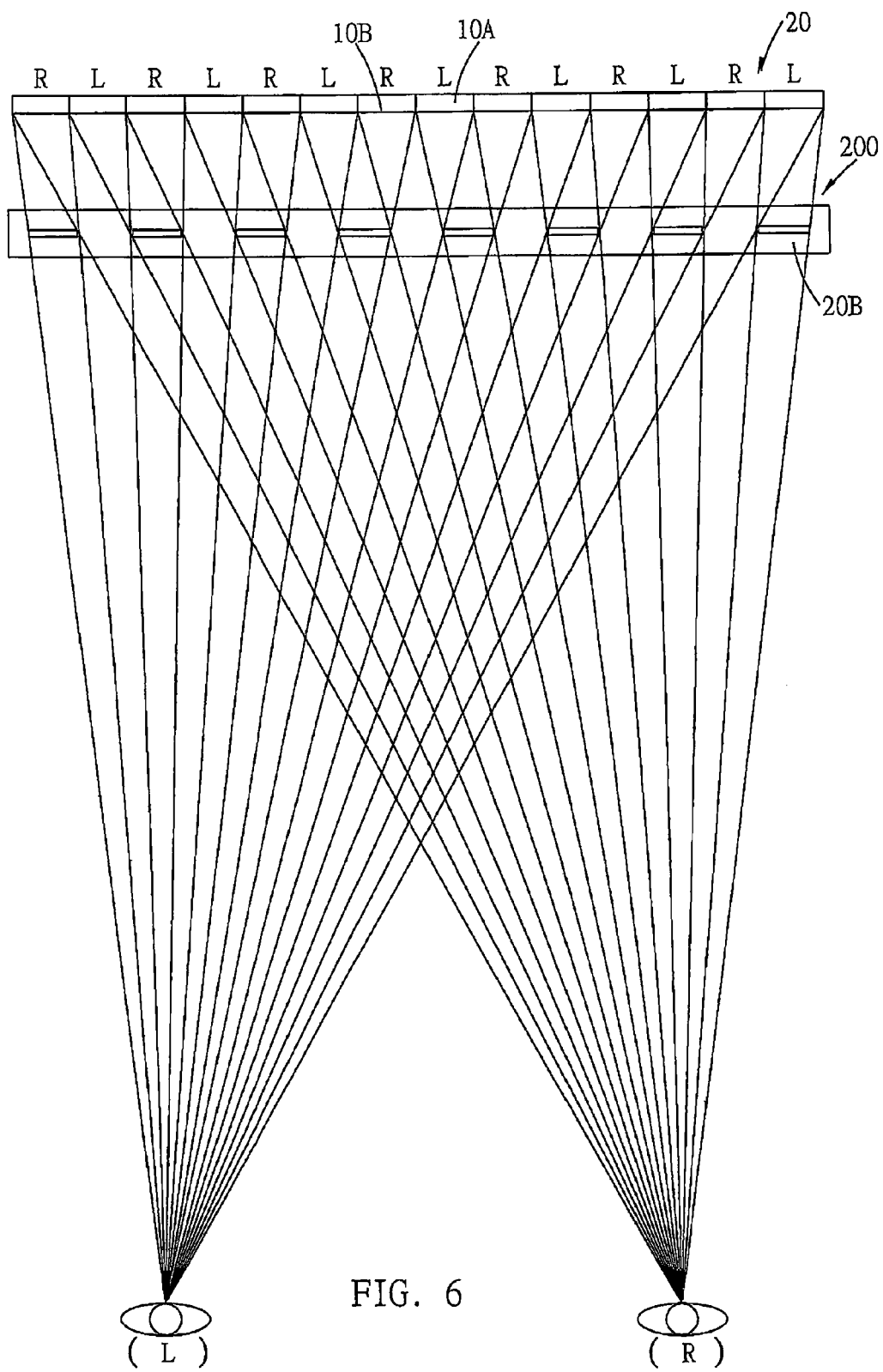
FIG. 6 shows a working diagram of a raster of the present invention.

For a second regeneration method, as shown in FIG. 5 and FIG. 6, after the images at the left and right angles have been retrieved separately by the photographing device 16, the images are processed by the data processing module for three-dimensional display 18 to form different image signals which are handed over to the displayer 20 to come out with the planar grid-shape pattern 12 as shown in FIG. 2. Whereas, the offset optical element 200 employs a parallel series of gratings 20B to transmit the partitioned images 10A, 10B to the left and right eyes L, R of the observer, using light penetrating gaps of the gratings 20B and through a shielding effect, such that the observer can sense the regeneration of the three-dimensional images.

Figure 3:
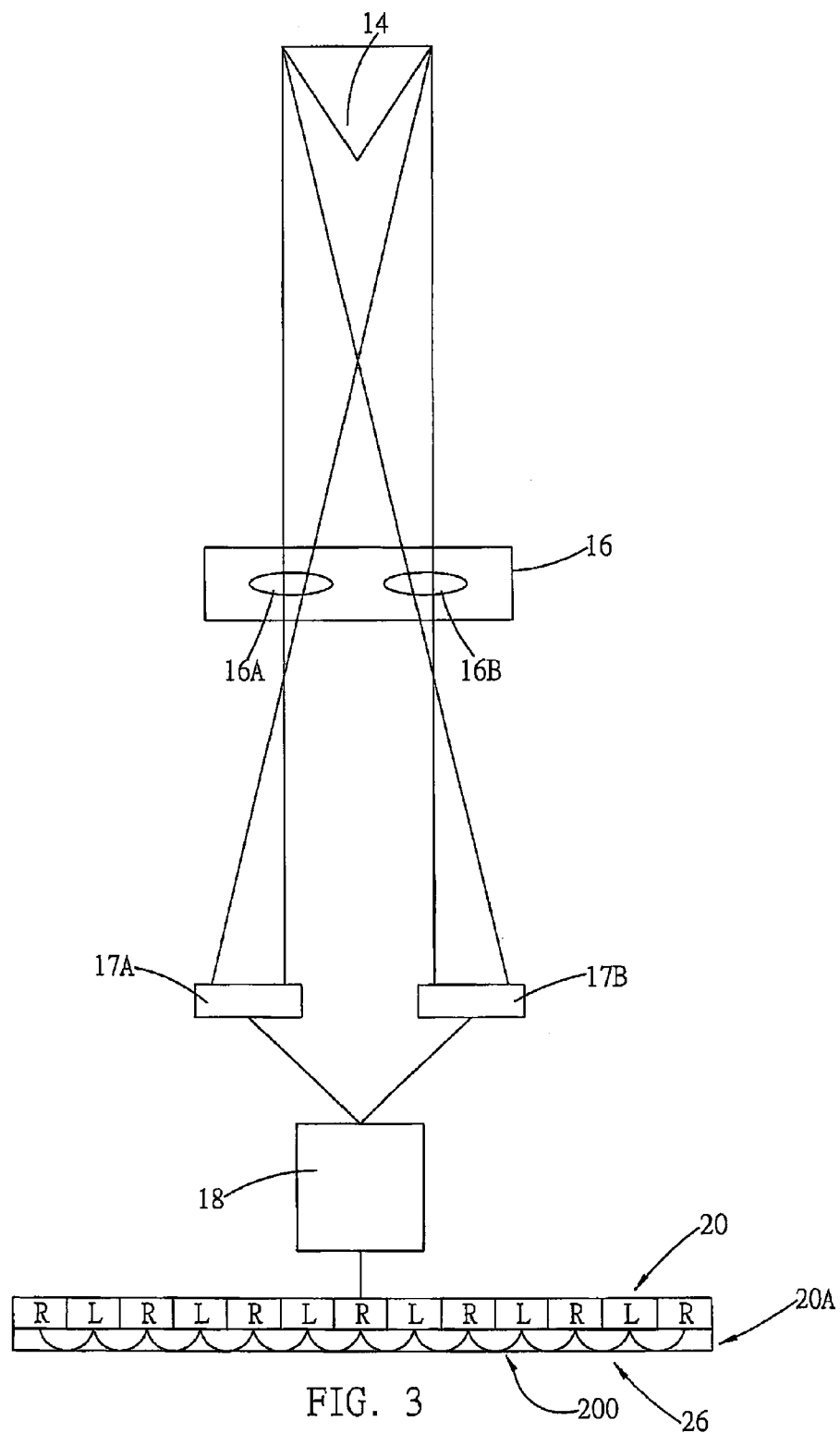
FIG. 3 shows a schematic view of an implementation of the present invention using cylindrical lenses to polarize light.
Figure 4:
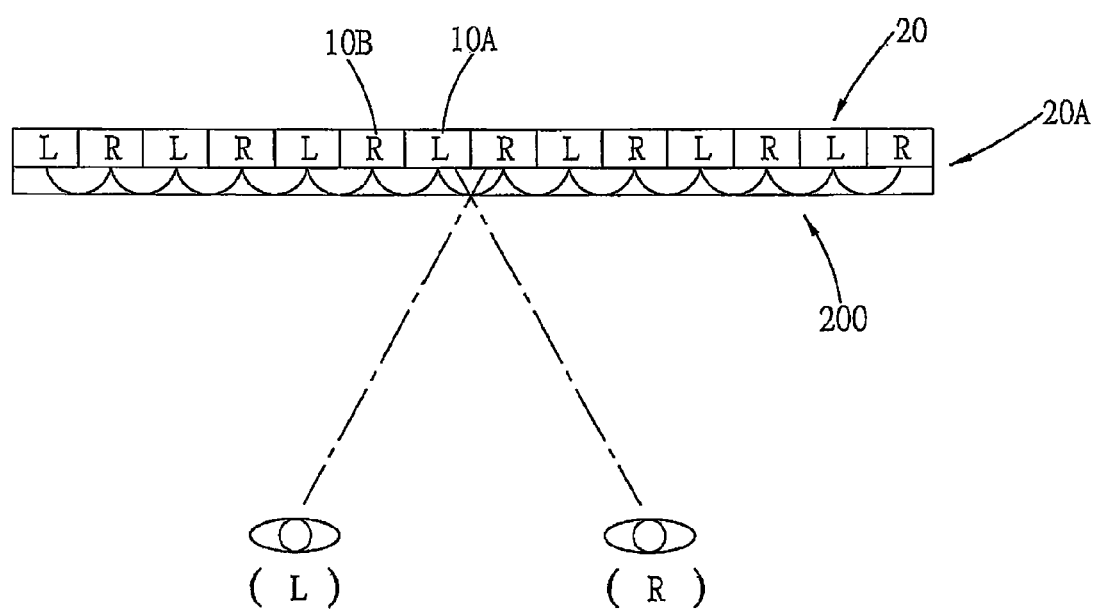
FIG. 4 shows a working diagram of cylindrical lenses of the present invention.

Regardless of the cylindrical lenses 20A as shown in FIG. 3 and FIG. 4 or the gratings 20B as shown in FIG. 5 and FIG. 6, the three-dimensional imaging is basically according to a parallax barrier principle, wherein the images which are arranged alternately pass through the long and thin longitudinal gratings 20B or the cylindrical lenses 20A first, and then are captured by two eyes for observation. As the longitudinal images entering into the left and right eyes are separated by a parallax barrier device, the images captured by the left and right eyes will result in a minor difference, and finally are read by retinas as the three-dimensional image.

The aforementioned offset optical element 200 is provided flat on an exterior surface of a screen of the displayer 20, and is engaged by a fixed assembling method or a dismountable assembling method. In the fixed assembling method, the offset optical element 200 can be attached on the surface of the displayer 20 by applying uniformly glue of high transmittance, which can achieves a waterproof effect. For the dismountable assembling method, on the other hand, the offset optical element 200 can be assembled by an ordinary engaging structure such as a latch or a fastener.

The aforementioned photographing device 16 includes two lenses 16A, 16B. As image waves which pass through the two lenses 16A, 16B operate on the respective light sensor 17A, 17B, image beams of the lenses 16A, 16B travel directly along axes, are refracted indirectly or deflected through reflection elements (not shown in the drawings), and finally, the axes of the image beams are still perpendicular to surfaces of the light sensors 17A, 17B, allowing the images to maintain fidelity. Therefore, the lens 16A and the associated light sensor 17A form an independent combined unit; whereas, the lens 16B and the light sensor 17B form another combined unit. When shooting angles of the two lenses 16A, 16B are adjusted respectively, the associated light sensors 17A, 17B are displaced simultaneously. The adjustment of the shooting angle can be used associatively with the offset optical element 200 at a different offset angle.

Referring to FIG. 1 and FIG. 2 which is a schematic view of a grid-shape pattern of the present invention, to finally provide the three-dimensional imaging effect, when shooting, the photographing device 16 needs a pre-determined rotation angle to shoot the object 14 and to acquire the first image 10A and the second image 10B corresponding to the object 14.

The pre-determined rotation angle α is related to a distance between pupils E and a distance to the object H by:

$$H = E/2c \tan \alpha.$$

When acquiring the first image 10A and the second image 10B, the data processing module for three-dimensional display 18 will first partition the first image 10A and the second image 10B into two longitudinal pictures, and then, allow the displayer 20 to display the grid-shape pattern 12 which is formed by interleaving two longitudinal pictures.

Figure 7:
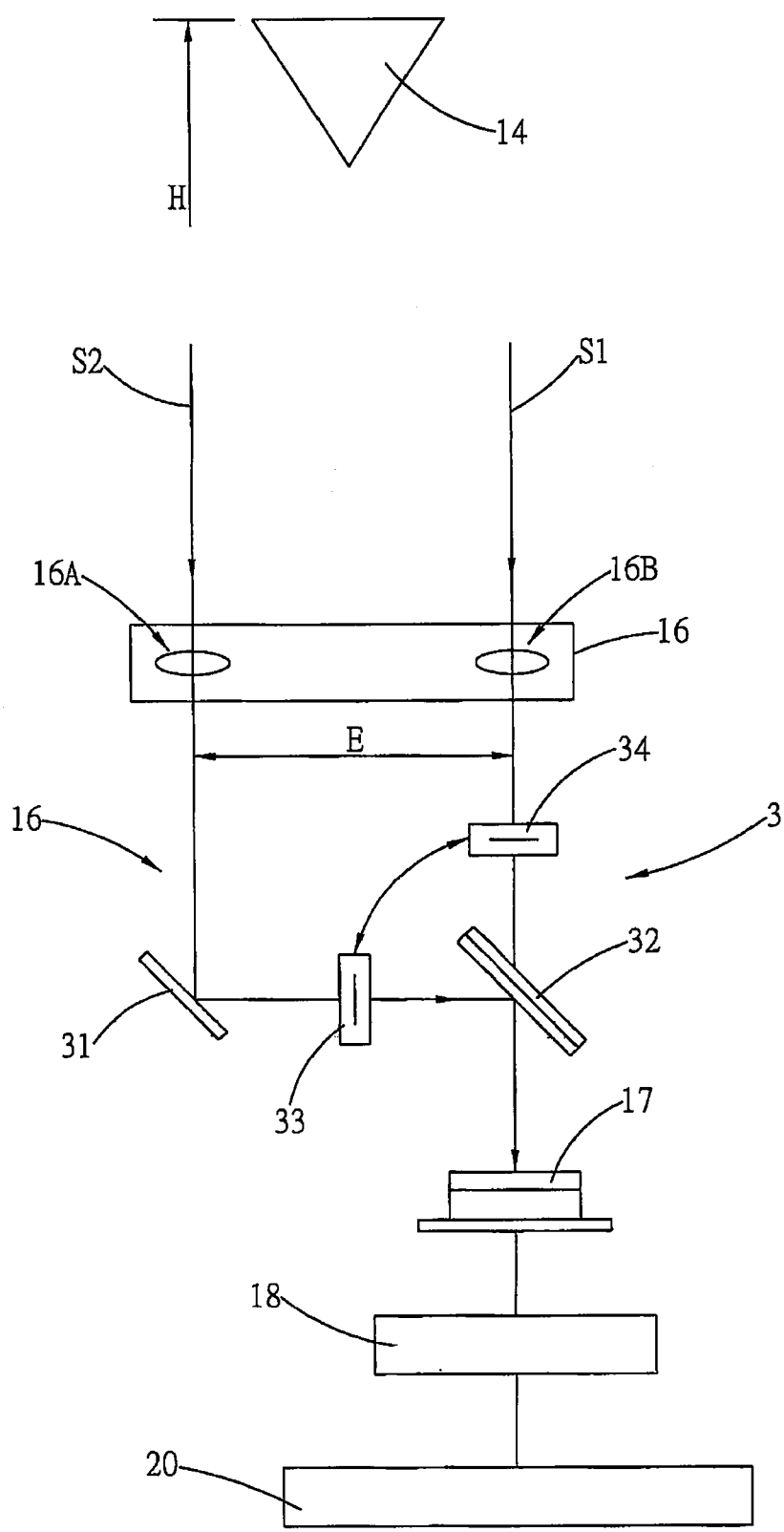
FIG. 7 shows a schematic view of another embodiment of the present invention making images at a left visual angle and a right visual angle.

Referring to FIG. 7, the photographing device 16 can be also constituted by the lens 16B which is configured along an incoming optical axis S1 for a single light sensor 17 and the lens 16A for another parallel optical axis S2. Light beams which are reflected from the object 14 enter into the photographing device 16 along the optical axes S1, S2 according to each visual angle. One optical axis S1 passes through a semi-reflection mirror 32 in a path to determine a timing when the light beam enters into the independent light sensor 17 through a shutter 34; whereas, the other optical axis S2 enters through a reflection mirror 31 to determine a timing when the light beam passes through, through an operation of the other shutter 33. After passing through, the light beam of the optical axis S2 is refracted to the light sensor 17 by the semi-reflection mirror 32. The two shutters 33, 34 work continuously at an alternate time schedule, allowing the light sensor 17 to acquire the light wave image signals which enter alternately along the left and right optical axes S1, S2. The image information at the left and right visual angles can be similarly processed by the data processing module for three-dimensional display 18 and be handed over to the displayer 20 to duplicate the aforementioned image pixels.

The aforementioned shutters 33, 34 work alternately or one after the other closely. For example, if an open time of the shutter is 1/60 sec, then the open times of the two shutters 33, 34 are the same, with only a difference in which one opens first and which one opens next. On the other hand, the shutter time is set up depending upon intensity of an ambient light source of the object 14 to be shot, with assistance of an automatic shutter and a device for sensing or detecting the ambient light. As this belongs to an ordinary image retrieving technology, further description is not provided.

When the object 14 is infinitely far away, the two optical axes S1, S2 are nearly parallel to each other. If the distance H is very near, then the reflection angles of the reflection mirror 31 and the semi-reflection mirror 32 can be adjusted to compensate, allowing the light beam of the optical axis S2 to enter into the light sensor 17 in alignment.

On the other hand, the shutter can be a shutter or a liquid crystal shutter of any mechanism, which can receive an instruction of an ordinary operating circuit (not shown in the drawings) to operate in a proper timing.

The light sensor used in the present invention is a CCD or CMOS device. For the sensor that uses the CMOS, it will facilitate producing a digital signal directly, and in terms of development to pixels of CMOS, resolution has been able to satisfy requirements. For instance, a camera product of SONY has been implemented with the CMOS light sensor and deflection of a vertical image has been corrected effectively; therefore, using CMOS to facilitate recording and transmitting the digital information can be applied to a cell phone.

Accordingly, regardless of the gratings 20B that are configured on the displayer 20, as shown in FIG. 5 and FIG. 6, or the cylindrical lenses 20A as shown in FIG. 3 and FIG. 4, the light beams that are emitted from the displayer 20 can be deflected leftward and rightward in the longitudinal series or can be separated, such that when being deflected leftward and rightward in the longitudinal series by the stereoscopic optical element 200, the grid-shape pattern 12 (as shown in FIG.

2) that was interleaved originally is equal to projecting the partitioned first image 10A and second image 10B to the left and right eyes L, R of the user respectively, allowing the user to see the three-dimensional image.

Besides, in many 3G mobile phones, usually two photographing devices 16 will be provided to supply respectively a function of a videophone and a function of picture taking or photographing. However, the photographing device 16 of the videophone usually faces toward the user and only faces outward when taking pictures or photographing. Therefore, a shooting direction needs to be adjusted for the photographing device 16 of the videophone; that is, the pre-determined rotation angle is adjustable to facilitate changing between using the videophone or the three-dimensional imaging function.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A mobile information kiosk with a three-dimensional imaging effect, comprising at least one photographing device with two lenses and a changeable angle, the two lenses being assembled on an exterior surface of the kiosk at a same side, shooting at a pre-determined visual angle, and capturing through a separately provided light sensor to acquire a first image and a second image corresponding to an object to be shot, and with the pre-determined visual angle being related to a distance between pupils and a distance to the object; a displayer, which is located on the exterior surface of the kiosk, at an angle different from the angle of the dual-lens photographing device, and displays synchronously the images; a stereoscopic optical element which is provided on the displayer and deflect light beams emitted from the displayer leftward and rightward in a longitudinal series, with the stereoscopic optical element being assembled by arranging side by side plural parallel cylindrical lenses; and a data processing module for three-dimensional display, which partitions the first image and the second image shot by the photographing device into two longitudinal pictures, and allows the displayer to display a grid-shape pattern formed by interleaving the two longitudinal pictures; wherein, when the grid-shape pattern that is displayed on the displayer and was interleaved originally is deflected leftward and rightward in the longitudinal series by the stereoscopic optical element, it is equal to projecting the non-partitioned first image and second image to a left eye and a right eye of a user respectively, allowing the user to see a three-dimensional image.

2. The mobile information kiosk with a three-dimensional imaging effect, according to claim 1, wherein a shooting angle of each of the two lenses of the photographing device is adjustable.

3. The mobile information kiosk with a three-dimensional imaging effect, according to claim 1, wherein two optical axes enter into the photographing device at a left and right visual angle, one optical axis directly projects to a light sensor, the other optical axis is refracted into the same light sensor through a reflection mirror, and one shutter is provided in each path along which one of the two optical axes enters into the light sensor, with the two shutters operating in an alternate time sequence that one shutter opens first and the other shutter opens next.

4. The mobile information kiosk with a three-dimensional imaging effect, according to claim 3, wherein the two optical axes are combined into a traveling path of light beams to be transmitted to the same light sensor, through a semi-reflection mirror.

5. The mobile information kiosk with a three-dimensional imaging effect, according to claim 1, wherein the stereoscopic optical element is dismountable from a screen of the displayer.

6. The mobile information kiosk with a three-dimensional imaging effect, according to claim 1, wherein the cylindrical lenses are provided with a circular cross section.

7. The mobile information kiosk with a three-dimensional imaging effect, according to claim 1, wherein the cylindrical lenses are provided with a semi-circular cross section.

8. The mobile information kiosk with a three-dimensional imaging effect, according to claim 1, wherein the cylindrical lenses are provided with a rhombus cross section.

9. A mobile information kiosk with a three-dimensional imaging effect, comprising at least one photographing device with two lenses and a changeable angle, the two lenses being assembled on an exterior surface of the kiosk at a same side, shooting at a pre-determined visual angle, and capturing through a separately provided light sensor to acquire a first image and a second image corresponding to an object to be shot, and the pre-determined visual angle being related to a distance between pupils and a distance to the object; a displayer, which is located on the exterior surface of the kiosk, at an angle different from the angle of the dual-lens photographing device, and displays synchronously the images; a stereoscopic optical element which is provided on the displayer and deflect light beams emitted from the displayer leftward and rightward in a longitudinal series, with the stereoscopic optical element being a parallel series of gratings; and a data processing module for three-dimensional display, which partitions the first image and the second image shot by the photographing device into two longitudinal pictures, and allows the displayer to display a grid-shape pattern formed by interleaving the two longitudinal pictures; wherein, when the grid-shape pattern that is displayed on the displayer and was interleaved originally is deflected leftward and rightward in the longitudinal series by the stereoscopic optical element, it is equal to projecting the non-partitioned first image and second image to a left eye and a right eye of a user respectively, allowing the user to see a three-dimensional image.

10. The mobile information kiosk with a three-dimensional imaging effect, according to claim 9, wherein a shooting angle of each of the two lenses of the photographing device is adjustable.

11. The mobile information kiosk with a three-dimensional imaging effect, according to claim 9, wherein two optical axes enter into the photographing device at a left and right visual angle, one optical axis directly projects to a light sensor, the other optical axis is refracted into the same light sensor through a reflection mirror, and one shutter is provided in each path along which one of the two optical axes enters into the light sensor, with the two shutters operating in an alternate time sequence that one shutter opens first and the other shutter opens next.

12. The mobile information kiosk with a three-dimensional imaging effect, according to claim 11, wherein the two optical axes are combined into a traveling path of light beams to be transmitted to the same light sensor, through a semi-reflection mirror.

13. The mobile information kiosk with a three-dimensional imaging effect, according to claim 9, wherein the stereoscopic optical element is dismountable from a screen of the displayer.

* * * * *